US007912366B2

(12) United States Patent
Huliyapur Math (10) Patent No.: US 7,912,366 B2
(45) Date of Patent: Mar. 22, 2011

(54) SYSTEM AND METHOD FOR PROVIDING PHOTOGRAPH LOCATION INFORMATION IN A WIRELESS COMMUNICATION DEVICE

(75) Inventor: Virupakshaiah Huliyapur Math, Bangalore (IN)

(73) Assignee: Kyocera Corporation, Kyoto (JP)

( * ) Notice: Subject to any disclaimer, the term of this patent is extended or adjusted under 35 U.S.C. 154(b) by 401 days.

(21) Appl. No.: 11/609,272

(22) Filed: Dec. 11, 2006

(65) Prior Publication Data

US 2010/0272426 A1 Oct. 28, 2010

(51) Int. Cl.
*G03B 17/20* (2006.01)
(52) U.S. Cl. ............ 396/296; 348/333.02; 396/310
(58) Field of Classification Search .......... 396/310, 396/431, 434, 429, 296; 348/333.02
See application file for complete search history.

(56) References Cited

U.S. PATENT DOCUMENTS

| | | | | |
|---|---|---|---|---|
| 5,671,451 | A * | 9/1997 | Takahashi et al. | 396/310 |
| 6,336,005 | B1 * | 1/2002 | Miyadera | 396/287 |
| 6,462,778 | B1 * | 10/2002 | Abram et al. | 348/239 |
| 6,690,883 | B2 * | 2/2004 | Pelletier | 396/321 |
| 6,995,792 | B1 * | 2/2006 | Ogura | 348/231.99 |
| 7,480,456 | B2 * | 1/2009 | Yanagida et al. | 396/310 |
| 7,623,176 | B2 * | 11/2009 | Hoshino et al. | 348/333.02 |
| 7,728,869 | B2 * | 6/2010 | Jung | 348/113 |
| 2002/0001468 | A1 * | 1/2002 | Kaku | 396/310 |
| 2002/0034384 | A1 * | 3/2002 | Mikhail | 396/310 |
| 2003/0105567 | A1 * | 6/2003 | Koenig et al. | 701/36 |
| 2004/0109063 | A1 | 6/2004 | Kusaka et al. | |
| 2005/0169558 | A1 * | 8/2005 | Dance et al. | 382/305 |
| 2005/0174451 | A1 * | 8/2005 | Nozaki et al. | 348/240.99 |
| 2006/0007315 | A1 * | 1/2006 | Singh | 348/207.99 |

FOREIGN PATENT DOCUMENTS

WO WO 2004049708 A1 * 6/2004

OTHER PUBLICATIONS

Weiss ("Digital Breadcrumbs for Your Photos" NY Times, Dec. 2004).*
Desmond ("Tech 2005, What's New and What's Next", PC World Dec. 2004).*
Shah, Agam: "Concord Shows Bluetooth Camera", PC Word article dated Jan. 8, 2004.*

* cited by examiner

Primary Examiner — Clayton E Labelle
Assistant Examiner — Leon W Rhodes (57) ABSTRACT

Descriptive location information is associated with and displayed with a photograph taken on a wireless communication device. The descriptive location information is derived from raw location data received from a global positioning system (GPS) receiver in the wireless communication device. The raw location data is cross-referenced with descriptive location information contained within, for example, look-up tables in a memory of the device. The descriptive location information describes the location where the image was taken, for example, a city, a landmark, a distance from a city or landmark, and is visible to a user on the image displayed on a screen of the wireless device or another device.

18 Claims, 5 Drawing Sheets

SYSTEM AND METHOD FOR PROVIDING PHOTOGRAPH LOCATION INFORMATION IN A WIRELESS COMMUNICATION DEVICE

TECHNICAL FIELD

The present invention generally relates to wireless communication devices, and more particularly to photograph functionality in wireless communication devices.

BACKGROUND

A wireless communication device, also referred to as a mobile phone, a wireless handset, etc., may include a camera module. These "camera phones" may include a variety of features comparable to standard digital camera counterparts such as built in flash, night vision, zoom-in, red eye correction, etc. Some photographs taken by camera phones include a time and date stamp associated with each image based upon settings specified by the phone manufacturer or by the user.

Once a photograph is taken by the mobile phone user, the photograph can be stored in the phone for later viewing on the phone. Later, the user can directly download the photographic images to a user's home computer, for example. However, in some phones, memory is limited which limits the number of photographs that can be stored on a phone. Thus, service providers offer services that allow the user to upload the photograph to a server of the service provider. The phone user is then billed for this service. The user can then access the photographs from the service provider and download the photos for storage in a personal device, such as a home computer, for viewing and for printing. This same service may also allow the user to send the photograph to another mobile phone user or to a particular location, such as an Internet or electronic-mail (e-mail) destination.

A user will typically arrange the digital photographs in electronic files or in software applications that allow the user to identify where the photograph was taken. Alternately, the user may print the photograph and label the photographs with notes regarding the location where the photograph was taken. Some camera phones allow the user to attach a caption to the photograph. In such instances, the user can attach a caption indicating the location that the picture was taken. However, this method of location identification is time consuming and is the digital equivalent of hand writing the location on the photograph. Thus, the photographer is highly likely to not use this option and, ultimately, will forget where a photograph was taken, particularly when many photographs are taken.

An advantage of having a camera phone is that an image can be sent immediately to another mobile phone user, or as mentioned above for example, to a user on other networks, for example, the Internet. A photograph that is taken by a user and later digitally sent to any place in the world can provide great incentives for others to visit the place where the photograph was taken. However, because the photograph is often not labeled by the sender, the photograph loses meaning in its association with a particular location.

Global positioning systems provide location data (longitude data and latitude data). Digital cameras are known that include a global positioning system (GPS) in the camera. The GPS provides location data that is appended in memory to the image data once a picture is taken. However, this information is not displayed with the picture. Similarly, wireless communication devices may include a global positioning system (GPS) within the phone for use by the user, or for use in various services provided to the user. For example, location information obtained by a GPS system within the wireless phone may automatically be sent to emergency services, such as E911. However, specific information such as GPS provided location coordinates may not be of particular significance to a user who later views a photograph. Also, the location information is not associated with or displayed when a photograph is being taken by a wireless phone. Therefore, a need exists to provide immediate identification of a location of a photograph taken by a wireless communication device.

SUMMARY

A method and system for automatically including location information associated with each image taken by a camera module in a wireless communication device is disclosed. In an exemplary embodiment, a photographic image is displayed on a wireless device also includes a display of location information either by itself or in addition to a time and/or a date stamp, for example. Typically, the location information is displayed in a specific area of the phone screen. In one embodiment of the invention, the location information is continuously updated in the view finder when the device is in a photograph mode.

In an exemplary embodiment, when a user takes a picture with the camera phone, the image is stored in a memory within the wireless communication device. Location information is determined and associated with the image. In an exemplary embodiment, the associated location information is stored in memory as part of meta-data that is appended to the image data. Meta-data is informational data that typically includes a time and a date stamp associated with the image. Meta-data also may include additional information such as shutter speed, aperture, and other camera disposition related information. Alternatively, the location information may be separately appended to or superimposed onto the image data, or may be stored in another part of memory and associated with the image.

The image data and the informational data, including the location data, may be communicated over a wireless network to other wireless devices or to other entities connected to the a network. This allows the receiving party to immediately identify the location where the image was taken. Location information as well as a photograph of a location may be used by, for example, emergency services to more easily locate the sending party.

The location information in one embodiment is specific to a location that the photograph is taken, for example, a street address. In other embodiments, the location information may indicate a general location, such as city or a landmark, or may indicate a distance from a nearest known location. In an exemplary embodiment, "raw" location data is acquired from a GPS module that is included within the camera phone. The location data may be used to generate the location information using, for example, a mapping function within the phone, or a source external to the wireless phone. In another embodiment, if the camera phone does not have a GPS receiver, the phone requests location information from a service provider.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts.

DETAILED DESCRIPTION

Figure 1:
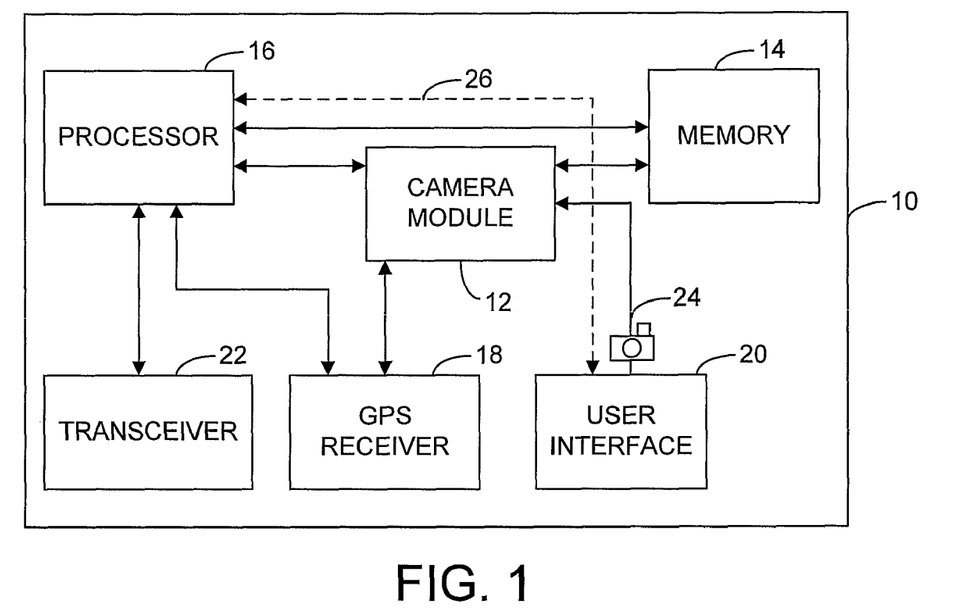
FIG. 1 is an exemplary block diagram of a wireless device having an internal GPS for providing location information with a photograph according to one embodiment of the invention.
Figure 6:
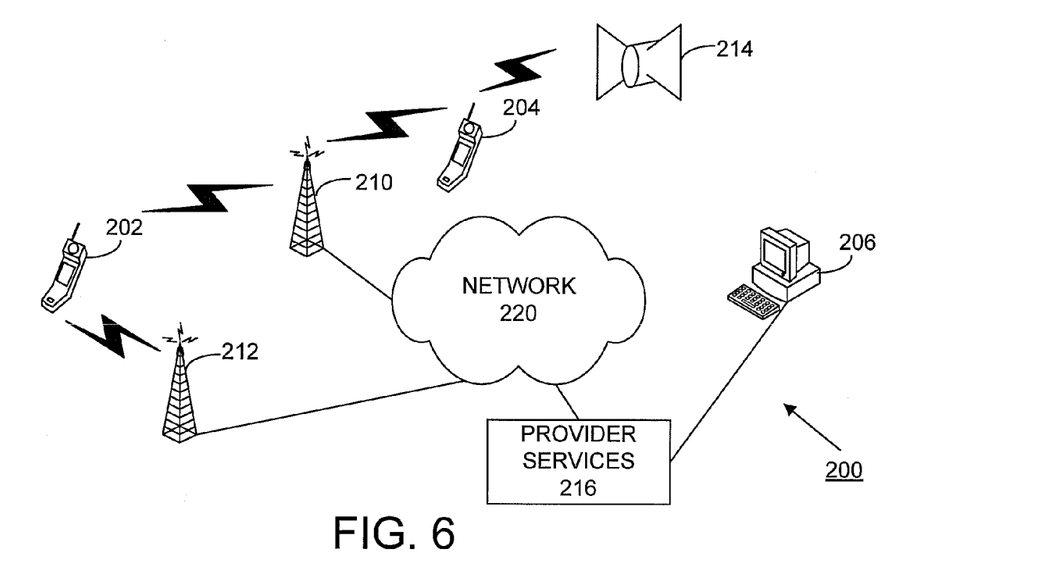
FIG. 6 is a diagram of a communication network according to one embodiment of the invention.

FIG. 1 is an exemplary block diagram of a wireless communication device 10 having an internal GPS receiver 18 for providing current location data to a processor 16 and/or a camera module 12 of device 10 of one embodiment of the invention. "Location data" as used herein is raw data, such as longitude and latitude coordinates typically produces by a GPS receiver. "Location information" as used herein is descriptive information associated with the location data, such as a city name, country name, landmark, etc. Wireless communication device 10 communication with a network 220, as shown in FIG. 6, utilizing a transceiver 22. Transceiver 22 and GPS receiver 18 are connected to a processor 16. GPS receiver 18, in one embodiment, also is connected directly to a camera module 12. In other embodiments, camera module 12 may be part of processor 16. A memory 14 is connected to processor 16 and camera module 12.

Figure 10:
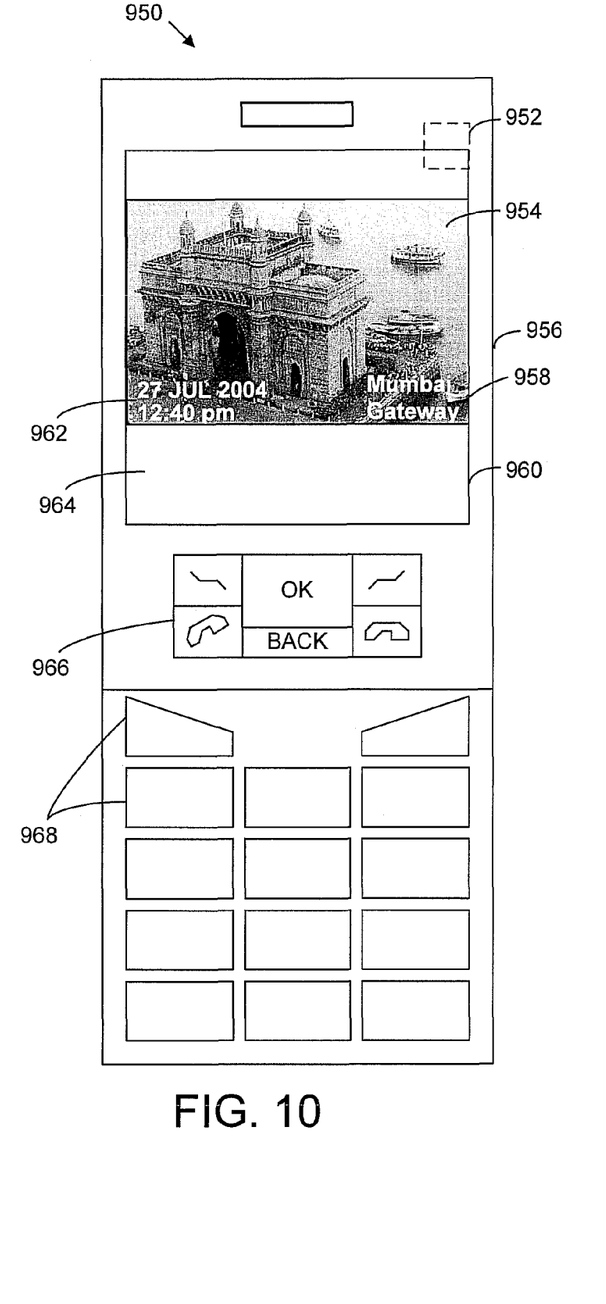
FIG. 10 is an illustration of a view screen showing a location of a picture being taken or previously taken by a wireless communication device.

A user interface 20 of one embodiment includes a display screen 960 and various function controls 966, 968 (as shown in FIG. 10) such as a take-picture control, a zoom control, etc. In a photograph mode, display screen 960 functions like a view finder of a digital camera. Referring again to FIG. 1, user interface 20 is connected by control lines 24 to camera module 12 when wireless device 10 is in a camera mode. In camera mode or other modes, user interface 20 also is connected by control lines 26 to processor 16.

Wireless communication device of FIG. 1 collects raw location data from GPS receiver 18. Collection of location data may be limited to specific modes, for example, when device 10 is in a photograph mode. Location data received from GPS receiver 18 is processed by processor 16 and/or camera module 12 to create location information for display on user interface 20. Location information derived from the location data may be a substantially exact location, for example, a street address or a landmark. In other embodiments, the location information provides a general location, such as a city or state. In yet other embodiments, the location information is associated by, for example, distance to a known location or landmark. The displayed location information, as discussed further below, may be in the form of text or a graphic. Device 10 may include option settings that allow the user to choose the type of location information displayed on user interface 20.

Continuing with FIG. 1, the location information may be determined by cross referencing the location data received from GPS receiver 18 with, for example, a look-up table stored in memory 14. Location information stored in memory 14 may be updated for a particular location by communication with provider services 216 (see FIG. 6). An over-the-air update of location information may be automatically loaded into wireless communication device 10 on a power up condition, or may be requested by device 10 if the location data does not correspond to location information stored in the look-up table of memory 14. For example, if a user from Bangalore in India takes a trip to Mumbai in India, device 10 can request updated location information upon power up of the phone in Mumbai since memory 14 is likely to have a look-up table specific to locations southernmost India.

As discussed above, memory 14 may have sufficient capacity to store location information for most cities, states, countries, landmarks, etc. Alternatively, a plug-in module to wireless device 10, such as a memory stick, may provide an exhaustive look-up table of location information to correlate to the received GPS location data.

Location data may be used for other functions within the phone. For example, location data from GPS receiver 18 may be used to determine whether device 10 is roaming, or to restrict or allow calls based upon the actual location of device 10. Therefore, the same correlation between the location data received from GPS receiver 18 may be used for multiple functions of wireless device 10.

Figure 2:
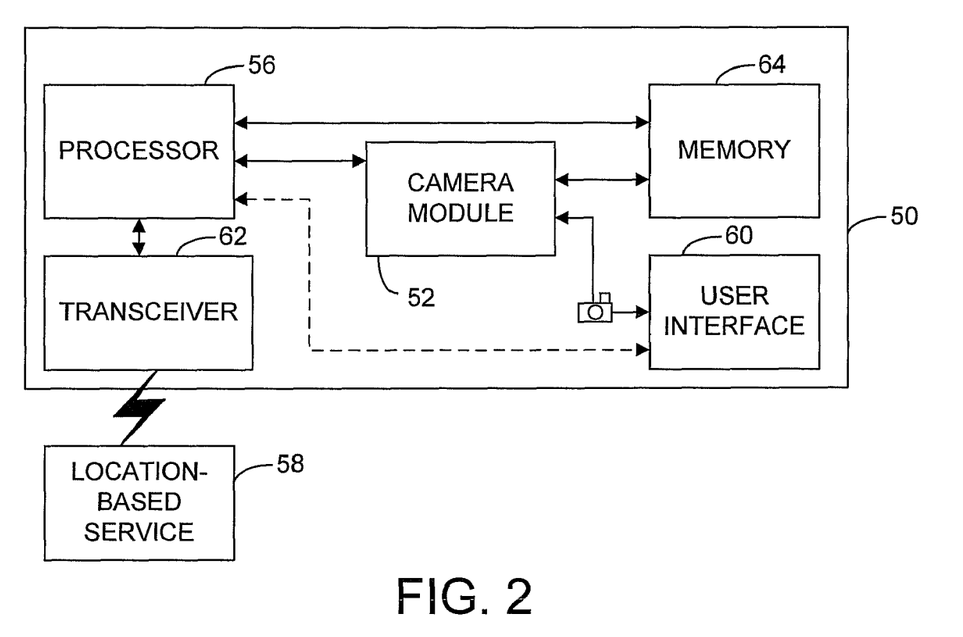
FIG. 2 illustrates a wireless camera phone which receives location information form a location based service according to another embodiment of the invention.

FIG. 2 illustrates a wireless communication device 50 which does not include a GPS receiver. Camera module 52 or processor 56 receives input from user interface 60 indicating that a user is entering a camera mode. A camera mode in one embodiment enables display of the location information on a screen 960 (as shown in FIG. 10) of the device 50. The user may have an option to enable or disable the display of location information in camera 10 which includes a GPS receiver 18 or in camera 50 which does not include a GPS receiver.

If location information is desired for display on view screen 960, the processor 56 sends a request through transceiver 62 to a location-based service 58. Location-based service 58 may return raw location data which must be processed as described above to associate a current location with a photograph image. Alternatively, location based service 58 may provide pre-processed location information that reflects a descriptive current location of wireless device 50. The location information may be requested from location-based service 58 at pre-determined intervals, or may be requested by trigger events, such as an action received through user interface 60. When a user takes a photograph using device 50, the received location information is associated with the photograph and stored in memory 64. Alternately, the associated location information and photograph are stored external to device 50.

Figure 3:
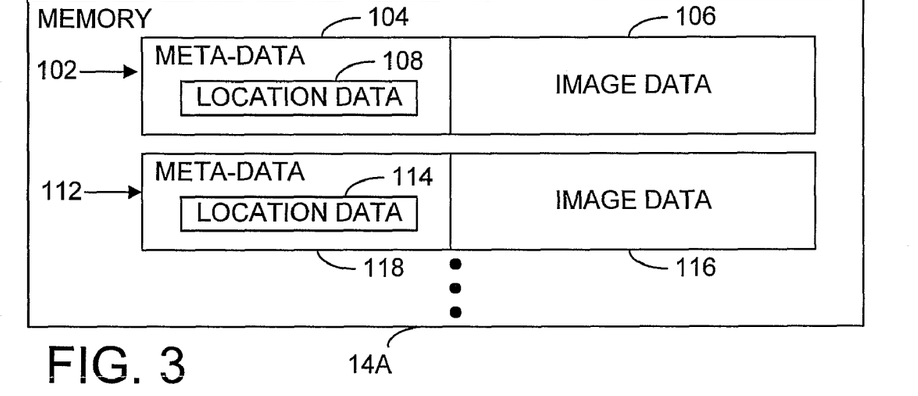
FIG. 3 illustrates a memory configuration of a wireless camera phone according to one embodiment of the invention.
Figure 4:
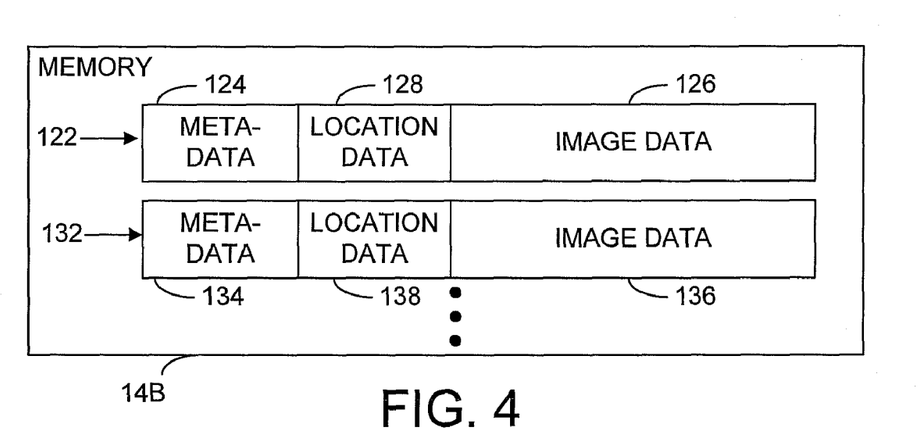
FIG. 4 illustrates a second embodiment of a memory configuration of a wireless camera phone.
Figure 5:
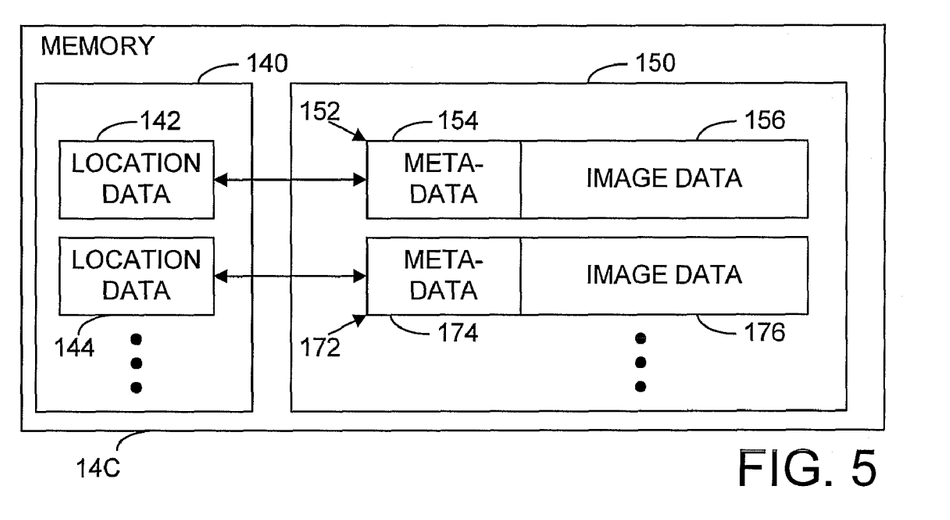
FIG. 5 illustrates another embodiment of a memory configuration of a wireless camera phone.

FIG. 3 illustrates a first memory configuration 14A that may be utilized in an embodiment of the invention. An image 102, 112 stored in memory 14A includes meta-data 104, 118 appended to image data 106, 116. Location data 108, 114 is included in meta-data 104, 114. FIG. 4 illustrates an alternate memory configuration 14B in which stored images 122, 132 include meta-data 124, 134 and location data 128, 138 appended to image data 126, 136. As shown in the memory configuration 14C of FIG. 5, a first memory location 150 may contain images 152, 172 which include image data 156, 176 appended with meta-data 154, 174. A second memory location 140 contains location data 142, 144 that is associated with images 152, 172, respectively. Alternate memory configurations (not shown) may be utilized that are optimized for use in a specific wireless device.

FIG. 6 illustrates a communication network 200 according to one embodiment of the invention. A wireless device 204 receives GPS data from a GPS satellite system 214 through a GPS receiver in the device 204. Device 204 can send photographic images with location information to a network 220 through a base station 210. Network 220 can forward the photograph images with location information to, for example, a computer device 206 through provider services 216 or to another wireless device 202 through base station 210, 212. In another embodiment, wireless communication device 202 includes camera capability, but does not have a GPS receiver. When a photograph is taken, or when device 202 is in a camera mode, location information is requested from provider services 216 through base station 212, 210 and network 220.

Figure 7:
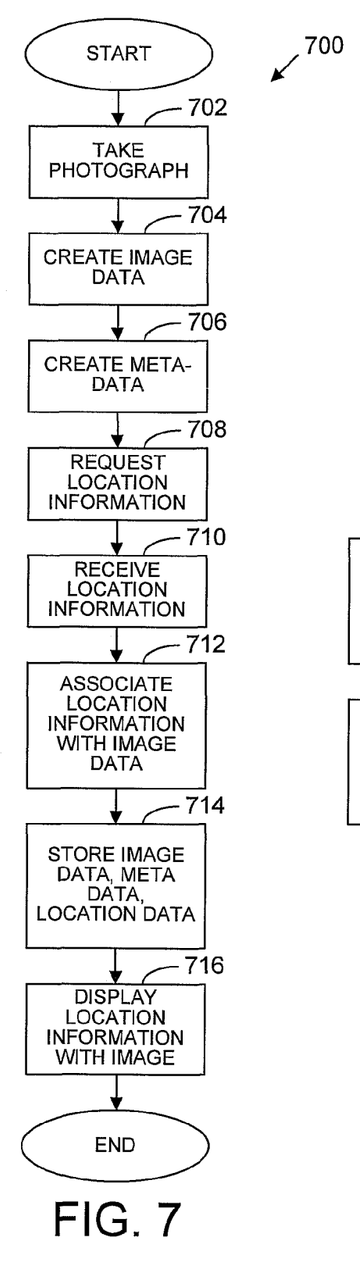
FIG. 7 is an exemplary method for providing location information with an photograph taken on a camera phone.

FIG. 7 illustrates an exemplary logical flow diagram 700 depicting a method for providing location information with a photograph taken on a camera phone according to one embodiment of the invention. Certain details and features have been left out of logical flow diagram 700 of FIG. 7 that are apparent to a person of ordinary skill in the art. For example, a step may consist of one or more sub-steps or may involve specialized equipment or materials, as known in the art. While steps 702 through 716 shown in logical flow diagram 700 are sufficient to describe one embodiment of the present invention, other embodiments of the invention may utilize steps different from those shown in logical flow diagram 700.

In FIG. 7, at block 702, a user takes a photograph utilizing camera phone 10. Camera module 12, 52, as shown in FIG. 1 or 2, creates image data in block 704. In block 706 meta-data is associated with the image data. In one embodiment, camera module 12, 52 creates the image data and the meta (informational) data. In another embodiment, camera module 12, 52 creates the photograph image only, and the phone processor 16, 56 performs the remaining data processing including creation of the meta-data. Portions of the meta-data information, such as the exact time and date for a time/date stamp, may be acquired from a wireless network 220 as shown in FIG. 6.

Continuing with FIG. 7, camera module 12, 52 requests location information in block 708. The location information is received by processor 16, 56 or by camera module in block 710. The location information is then associated with the image data in block 712. The image data, the location data and the meta-data, if applicable, is stored in phone memory 14, 64 as shown in block 714. In block 716, the location information is displayed on user interface 20, 60 of wireless device 10, 50.

Figure 8:
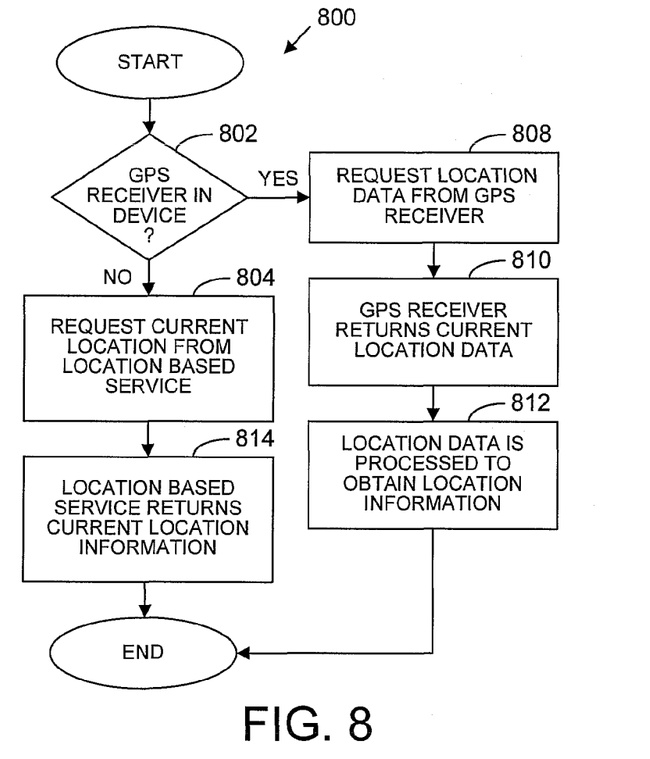
FIG. 8 is an exemplary method for acquiring location information for association with a photograph taken on a camera phone.

FIG. 8 further illustrates a request location information block 708 as shown in FIG. 7. Certain details and features have been left out of logical flow diagram 800 of FIG. 8 that are apparent to a person of ordinary skill in the art. For example, a step may consist of one or more sub-steps or may involve specialized equipment or materials, as known in the art. While steps 802 through 814 shown in logical flow diagram 800 are sufficient to describe one embodiment of the present invention, other embodiments of the invention may utilize steps different from those shown in logical flow diagram 800. In blocks 802 and 808 of method 800 for obtaining location information, if a GPS receiver is in device 10 then camera module 12 or processor 16 requests location information from GPS receiver 18. In block 810, GPS receiver 18 returns current location data. The location data then is processed by processor 16 or camera module 12, as shown in block 812, to obtain location information for associating with an image.

Continuing with FIG. 8, if device 50 does not have a GPS receiver, then camera module 52 or processor 56 requests location information from location based service 58, as shown in block 804. In block 814, location based service 58 returns current location information. As discussed above, raw location data may be returned to device 50. In such an embodiment, the location data is associated with descriptive location data that may be stored in memory 64.

Figure 9:
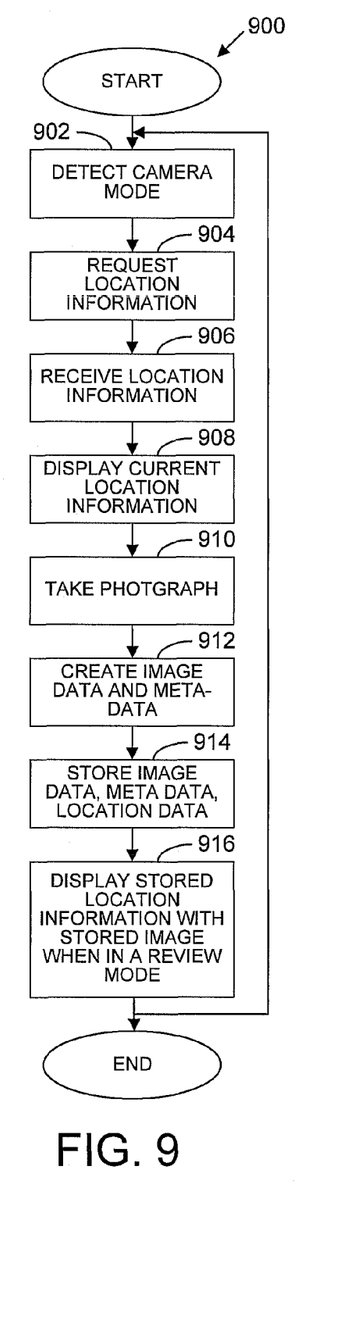
FIG. 9 is an alternate embodiment of providing location information in a photograph mode of a wireless communication device.

FIG. 9 illustrates another method for displaying location information. Certain details and features have been left out of logical flow diagram 900 of FIG. 9 that are apparent to a person of ordinary skill in the art. For example, a step may consist of one or more sub-steps or may involve specialized equipment or materials, as known in the art. While steps 902 through 916 shown in logical flow diagram 900 are sufficient to describe one embodiment of the present invention, other embodiments of the invention may utilize steps different from those shown in logical flow diagram 900.

In the embodiment illustrated in flow diagram 900, a camera mode is detected in block 902. Detection of a camera mode may be triggered, for example, by a user selecting a camera option. Upon detection of a camera mode, location information is requested in block 904 and received in block 906. As discussed above, location information is processed based upon location data received from a GPS receiver or from location based services. In block 908, current location information is displayed on a screen 960 (see FIG. 10) of a user interface.

In one embodiment of the invention, the user may have an option (not shown in FIG. 9) to change the format of a type of location information that is displayed on screen 960. For example, referring to FIG. 10, location information 958 is text of a well known landmark, e.g., Mumbai Gateway in India. However, the user may wish to display location information that displays text of the city and country, that is, "Mumbai, India". Alternatively, the user may wish to display a graphic of the location, for example, an outline of a map of India and an indicator of the current location.

Continuing with FIG. 9, a user takes a photograph in block 910. Image data and meta-data are created for the photograph 912. The image data, meta-data and location data is stored in memory, as shown in block 914. In block 916, the location information is displayed as part of the photograph whenever the photograph is displayed, for example, in a review photograph mode on the device 10, 50 or on another device or computer. The location information displayed on the device screen 960 is updated periodically or upon detection of a trigger event as discussed above.

FIG. 10 is an illustration of location information 958 on a photograph 954 displayed on wireless communication device 950 according to one embodiment of the invention. Device 950 has a camera lens 952 on a second surface of the device casing 956. A screen 960 displays a current image 954 of what is viewed by lens 952 or a stored image. Displayed image 954 may include a time and date stamp 962. Location information 958 is displayed on the image. The location information 958, although shown displayed in a right corner of the image, may be displayed in various locations on the image. Also, the size and positioning of location information 958 is illustrative only, and may vary. For example, location information 958 may be positioned in the left lower corner with a time and date stamp, and the text size may be very small. In another embodiment, the user may have an option to choose the appearance of location information 958. As discussed above, for example, location information 958 may be a specific address or a general city location. Also, location information 958 may be a graphic symbol of the current location. As discussed above, location information 958 is associated with image 954 that is taken by the user. The image 954 and location information 958, and other meta-data such as the time/date stamp, is stored in memory with the image, or sent with the image to another device 202, 206 through a communication network 220 as illustrated in FIG. 6.

Continuing with FIG. 10, wireless device 950 has a variety of control buttons 966, 968 for operating the device 950 in a camera mode and in a phone mode. In yet another embodiment, a user may take a photograph while simultaneously participating in an active call in a phone mode. The screen 960 in one embodiment reserves an command/option area 964 for providing instruction and soft controls for a user.

Figure 11:
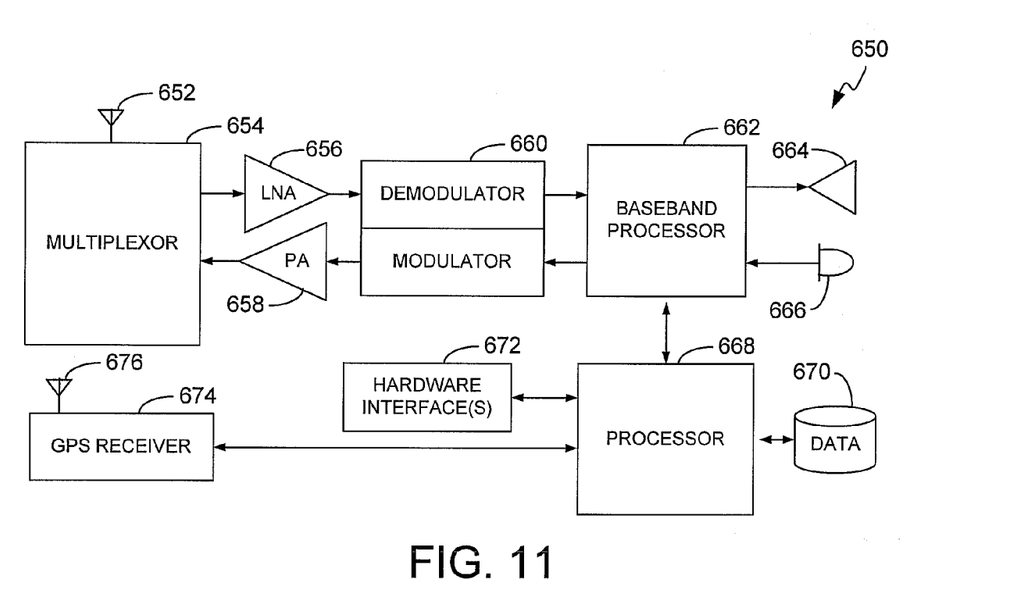
FIG. 11 is a block diagram illustrating an example wireless communications device operable to execute the methods depicted by FIGS. 7, 8 and 9.

FIG. 11 is a block diagram illustrating an exemplary wireless communications device 650 that may be used in connection with the various embodiments described herein. For example, wireless communications device 650 may be used in conjunction with a wireless handset or PDA network device. However, other wireless communications devices and/or architectures may also be used, as will be clear to those skilled in the art.

In the illustrated embodiment, wireless communications device 650 comprises an antenna 652, a multiplexor 654, a low noise amplifier ("LNA") 656, a power amplifier ("PA") 658, a modulation circuit 660, a baseband processor 662, a speaker 664, a microphone 666, a processor 668, a data storage area 670, a hardware interface 672 and a GPS receiver 674 that is connected to a dedicated antenna 676. Antenna 676 may also be the same as antenna 652, that is a multi-mode antenna. Various user interface devices (not shown), such as keypads and display devices, may be communicably couple to hardware interface 672 for receiving user input and communicating output messages. In wireless communications device 650, radio frequency ("RF") signals are transmitted and received by antenna 652. Elements 654, 656, 658, and 660 may be collectively referred to as a transceiver.

Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660. The demodulator strips away the RF carrier signal leaving a base-band receive signal, which is sent from the demodulator output to base-band processor 662.

If the base-band receive audio signal contains audio information, then base-band processor 662 decodes the signal and converts it to an analog signal. Then the signal is amplified and sent to speaker 664. Base-band processor 662 also receives analog audio signals from microphone 666. These analog audio signals are converted to digital signals and encoded by base-band processor 662. Base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to power amplifier 658. Power amplifier 658 amplifies the RF transmit signal and routes it to multiplexor 654 where the signal is switched to the antenna port for transmission by antenna 652.

Baseband processor 662 is also communicatively coupled with processor 668. Processor 668 has access to a data storage area 370. Processor 668 is preferably configured to execute instructions embodied in software such as methods 700, 800 and 900 of FIGS. 7-9, respectively that can be stored in data storage area 670.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

From the above description of exemplary embodiments of the invention, it is manifest that various techniques and wireless devices can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A computer implemented method for identifying a location associated with a digital photograph taken on a digital device having a camera, wherein one or more processors are programmed to perform steps comprising:
    detecting a camera mode;
    obtaining current location information;
    presenting an image of the field of view from the camera on a display of the digital device;
    presenting said current location information superimposed over said field of view from the camera on said display of the digital device;
    receiving an instruction to take a picture after presenting said image and said current location information;
    storing the field of view from the camera as a digital photograph; and
    storing said current location information in association with said digital photograph.

2. The method of claim 1, further comprising sending the digital photograph and said associated current location information to a second device via a wireless communication network.

3. The method of claim 1, further comprising obtaining updated current location information and presenting said updated current location information superimposed over said field of view from the camera on said display of the digital device.

4. The method of claim 1, further comprising receiving a selection for a format of the current location information superimposed over said field of view from the camera on said display of the digital device and re-presenting the current location information superimposed over said field of view from the camera on said display of the digital device in accordance with said selected format.

5. The method of claim 1, wherein the current location information is one of a landmark, a distance from a landmark, a street, a city, a state or a country.

6. The method of claim 1, wherein storing said current location information in association with said digital photograph comprises storing the current location information as metadata associated with the digital photograph.

7. A wireless communication device, comprising:
a GPS receiver configured to determine a current location;
a camera configured to create a digital photograph from its field of view;
a memory configured to store executable programmed modules and information including one or more digital photograph images and current location information;
a display for presenting information to a user of the wireless communication device;
a processor communicatively coupled with the GPS receiver, the camera, the memory and the display, said processor configured to present an image of the field of view from the camera on the display, obtain current location information from the GPS receiver, present said current location information superimposed over said field of view from the camera on said display, and in response to receiving an instruction to take a picture after presenting said image and said current location information, store in the memory the field of view from the camera as a digital photograph and store in the memory the current location information in association with said digital photograph.

8. The device of claim 7, further comprising a transceiver for sending the digital photograph and the associated current location information to a second wireless communication device via a wireless communication network.

9. The device of claim 7, wherein the processor is further configured to obtain updated current location information from the GPS receiver and present said updated location information superimposed over said field of view from the camera on said display.

10. The device of claim 7, wherein the processor is further configured to receive a selection for a format of the current location information superimposed over said field of view from the camera on said display and re-present the current location information superimposed over said field of view from the camera on said display in accordance with said selected format.

11. The device of claim 7, wherein the current location information is one of a landmark, a distance from a landmark, a street, a city, a state or a country.

12. The device of claim 7, wherein the processor is configured to store said current location information in association with said digital photograph by storing the current location information as metadata associated with the digital photograph.

13. A non-transitory computer readable medium having stored thereon one or more sequences of instructions for causing one or more processors to perform the steps for identifying a location associated with a digital photograph taken on a digital device having a camera, the steps comprising:
detecting a camera mode;
obtaining current location information;
presenting an image of the field of view from the camera on a display of the digital device;
presenting said current location information superimposed over said field of view from the camera on said display of the digital device;
receiving an instruction to take a picture after presenting said image and said current location information;
storing the field of view from the camera as a digital photograph; and
storing said current location information in association with said digital photograph.

14. The medium of claim 13, further comprising sending the digital photograph and said associated current location information to a second device via a wireless communication network.

15. The medium of claim 13, further comprising obtaining updated current location information and presenting said updated current location information superimposed over said field of view from the camera on said display of the digital device.

16. The medium of claim 13, further comprising receiving a selection for a format of the current location information superimposed over said field of view from the camera on said display of the digital device and re-presenting the current location information superimposed over said field of view from the camera on said display of the digital device in accordance with said selected format.

17. The medium of claim 13, wherein the current location information is one of a landmark, a distance from a landmark, a street, a city, a state or a country.

18. The medium of claim 13, wherein storing said current location information in association with said digital photograph comprises storing the current location information as metadata associated with the digital photograph.

* * * * *